(No Model.) 2 Sheets—Sheet 1.
C. G. MAYER.
APPARATUS FOR COOLING AND LUBRICATING THE WORKING PARTS OF PUMPS.
No. 450,517. Patented Apr. 14, 1891.
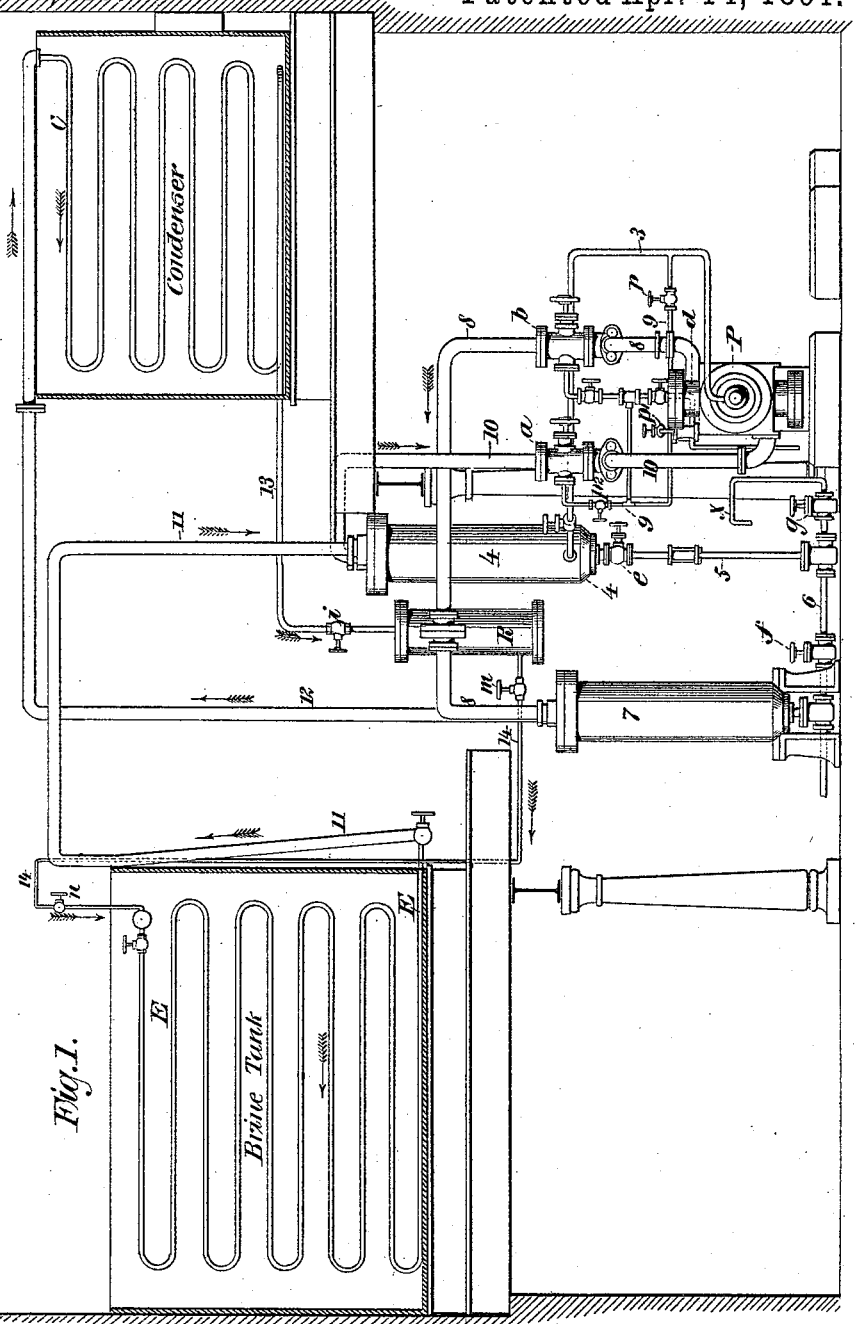
Fig. I.
WITNESSES:
Gustave Dieterich
H. B. Knight
INVENTOR
C. G. Mayer.
BY Knight Bros.
ATTORNEY

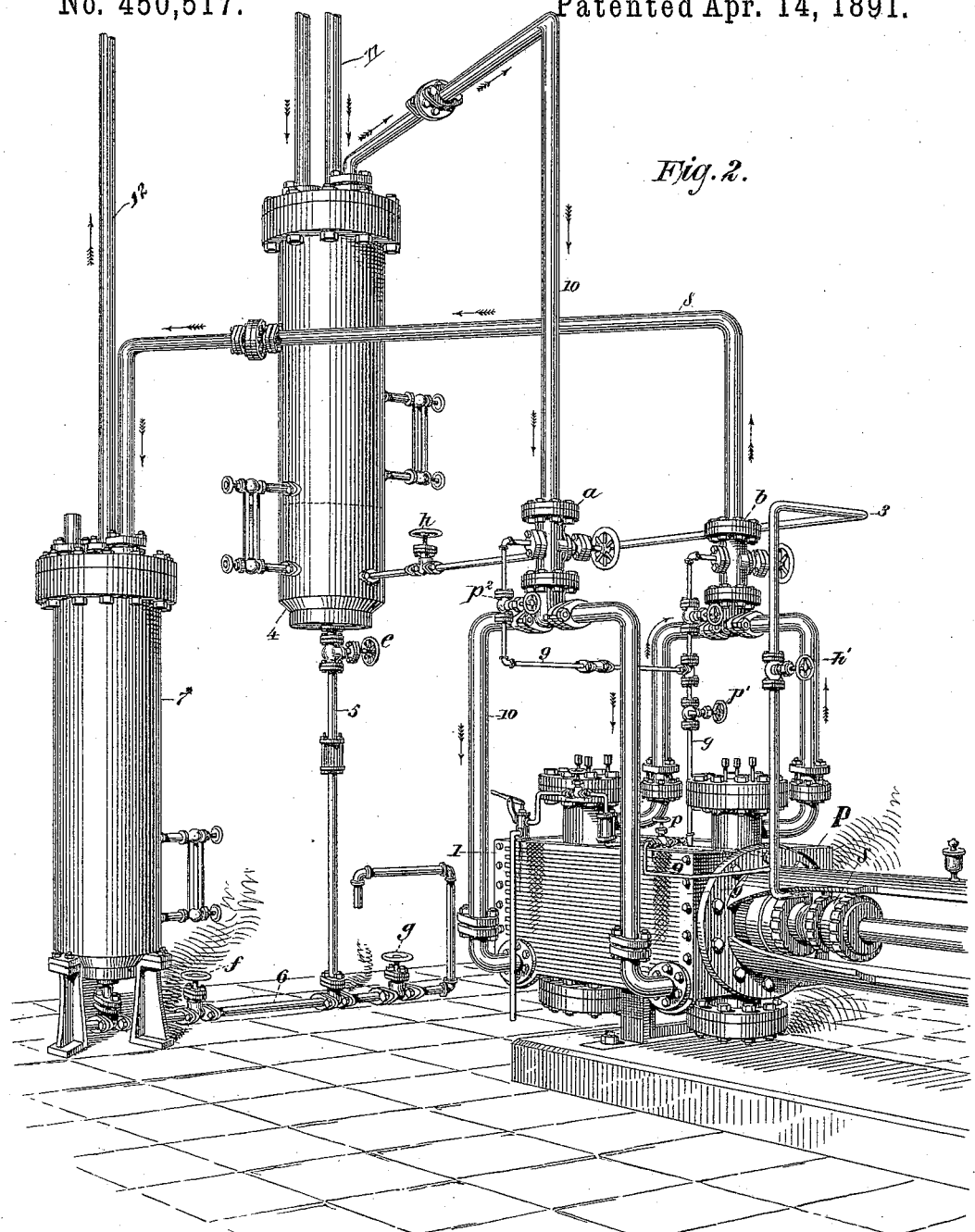

UNITED STATES PATENT OFFICE.

CHARLES G. MAYER, OF NEW YORK, N. Y.

APPARATUS FOR COOLING AND LUBRICATING THE WORKING PARTS OF PUMPS.

SPECIFICATION forming part of Letters Patent No. 450,517, dated April 14, 1891.

Application filed December 29, 1886. Serial No. 222,892. (No model.)

*To all whom it may concern:*

Be it known that I, CHARLES G. MAYER, of New York city, county and State of New York, have invented certain new and useful Improvements in Apparatus for Cooling and Lubricating the Interior Working Parts of Gas-Pumps, which are especially designed and adapted for use in connection with refrigerating-machines, of which the following is a specification.

Heretofore in machines and apparatus of this kind there has been immense difficulty in regulating the flow and supply of the oil owing to the misunderstanding of various refrigerating apparatus manufacturers as to the nature of the fluids with which they had to deal, as well as to the actual requirements of a machine that is adapted to work favorably under all possible conditions and so constructed that the various parts of the apparatus will co-operate and work together under all contingencies. Heretofore, also, machines have been projected which are uneconomical from the fact that leakages occur, thereby entailing great waste and loss of gases, and said machines are undesirable for the additional reason that they seek to cool the lubricating-liquid while under high pressure, thereby rendering it impossible to produce the best results and making the whole operation expensive and inefficient. To dispense with these drawbacks and to produce a machine that is thoroughly effective and economical is the object of my present invention.

This invention relates to an improved apparatus for cooling and lubricating the interior working parts of a gas-pump by means of bringing the oil or lubricating compound in direct contact with the low-pressure gas in the low-pressure system. By gas-pumps I include the stuffing-box as well as the cylinder. By means of a pipe provided with suitable valves or cocks it is arranged so as to automatically convey and reconvey the oil from the stuffing-box of the machine to what I term a "low-pressure trap," placed in a low-pressure system of the refrigerating apparatus, so that the oil after it has become heated in the stuffing-box will transmit the heat to the oil in the pipe and to the trap aforesaid, and by this means the temperature of the oil is kept down and the stuffing-box is constantly supplied with a sufficient quantity of cold low-pressure oil, the said oil being cool enough to keep the stuffing-box at the proper temperature. For this reason and for the additional reason that the method I have described only necessitates a single pipe for connecting the stuffing-box and the low-pressure trap I term it a natural circulation of heat and cold. As, also, oil will accumulate in the high-pressure system and in the arrangement which I shall hereinafter describe it will accumulate in what I preferably call a "trap" or "tank," connected directly to the high-pressure side of the pump, and, as before stated, the oil will accumulate to some extent in this trap, I have arranged a pipe in connection with the bottom or the high-pressure trap and connected it with the bottom of the low-pressure trap, suitable valves intervening to regulate the flow of the liquid, the arrangement being such that when the oil begins to accumulate in the high-pressure trap these valves are opened, whereupon the oil will be forced into the low-pressure trap and from thence, after being cooled, to the stuffing-box before mentioned.

Referring to the accompanying drawings, which form a part of this specification, Figure 1 is a general view, and Fig. 2 is a perspective view, of my apparatus.

P is a gas-pump which exhausts the gas through the suction-pipe 10 in the low-pressure system and discharges it into the pipe 8 in the high-pressure system. From the gas-pump the discharge-pipe 8 conveys the compressed gas into the high-pressure trap 7. The pipe 8 is provided with a valve *b* and extends some distance into the trap 7. The pipe 12, which commences at top of trap 7, conveys the compressed gas away from the trap into the top of the condenser-coil C, through which the gas flows and passes into the liquid-receiver R by means of pipe 13, having valve or valves *i*.

During the passage of the gas through coil C the heat is extracted from the gas and the same passes into receiver R in a liquid state under the existing high or condenser pressure. From this liquid-receiver R the liquid gas is conveyed by means of pipe 14 from or near the bottom of receiver R into the top of the refrigerating-coil E, having the valves *m* and *n* between. Immediately beyond the valve *n* the liquid gas is relieved from the high or condenser pressure, enters the low-pressure system, and follows the refrigerating-coil E, from which it passes through pipe 11 into the low-pressure trap 4, the said pipe entering the trap in the top. During this passage the gas is allowed to satiate itself with heat taken from the brine in which the coil or coils E are immersed. From the top of same trap pipe 10, having valve *a*, brings the gas to the suction-valves of gas-pump P to be recompressed and to go through the same evolution or transformation.

It will be seen by the foregoing description that the refrigerating apparatus containing the gas is divided into two distinct systems: first, the low-pressure system, in which the liquid gas is allowed to expand or evaporate in order to produce the necessary low temperature in the gas volume, and in which the gas is allowed to absorb heat; second, the high-pressure system, in which low-pressure gas after passing through the low-pressure system and being satiated with heat is compressed in order to change the heat contained latent in the low-pressure gas into sensitive heat, thereby increasing the temperature of the gas sufficiently to be taken up or absorbed by water or other conductors of heat, whereupon the gas under pressure caused by its own resistance will again collapse into the liquid state and be ready to go through the same evolution.

The first system commences on the lower side of the valve *n*, passes through coil E, through pipe 11 into trap 4, and from there through pipe 10 into gas-pump P.

The second or high-pressure system commences at the discharge-valve *d* on gas-pump P, extends through pipe 8 into the high-pressure trap 7, from there through pipe 12 into the coil C′, through the pipe B into the liquid-receiver R, and then through the pipe 14 to the upper side of the valve *n*.

This, in brief, is a description of the systems which all refrigerating-machines using gas as a medium employ, the different systems varying only in the adaptation, combination, and construction of the various parts.

My lubricating and oil-cooling system is constructed as follows: From the bottom of the low-pressure trap 4 the pipe 5, having valve *e*, connects with the pipe 6, having valve *f*. The pipe 6 extends into the bottom of the high-pressure oil-trap 7 and is provided with an extension-pipe *x*, having valve *g*, as shown. From the side and from the bottom of the low-pressure trap 4 I run the pipe 3, having valves *h h′*, into the stuffing-box S of the gas-pump. From this pipe 3 a branch pipe 9 is taken and led or connected into the low-pressure system or suction-pipe, preferably at the valve *a*. This pipe has the valves *p, p′*, and *p″* in the connection. The high-pressure trap 7 has a glass gage, as shown, to indicate the oil-line, and the low-pressure trap 4 has two glass gages, arranged for security above one another, so as to keep the oil in sight, and preferably arranged as shown.

The method of operating is as follows: When the machine is to be charged with oil, the end of pipe *x* is turned into an oil barrel or tank and connected with the gas-pressure in the low-pressure system, (which is generally called "back-pressure,") reduced to a partial vacuum by means of the gas-pump P. Then valve *f* being closed valves *e* and *g* are opened and the oil allowed to rush into the trap 4 by the atmospheric pressure behind it until the glass gages show a sufficient quantity, when both valves are again closed. When the oil is to be taken out of the machine, the back-pressure is reduced to two or three pounds, the end of pipe *x* turned into a barrel or tank, and the valve *f* being closed and valve *e* entirely opened, and valve *g* so manipulated as to regulate the oil flow. During the working of a refrigerating-machine the return-gas going into the trap 4 on its way to the pump-section is always cold enough to reduce the temperature in the oil sufficiently for cooling purposes. For the purpose of cooling and lubricating the stuffing-box the valves *h h′* are opened, allowing the heat generated in the stuffing-box 5 to be conducted through pipe 3 into body of the oil volume held in trap 4, where it is absorbed by the return-gas in its way to the gas-pump P. For the purpose of lubricating the gas-pump P the valves *p′* and *p″* on branch pipe 9 are opened fully, and by means of valve *p* enough of the lubricant is let into the gas-pump to keep the piston from cutting. For further security there may also be a connection anywhere between pipe 9 and the oil-pump, as shown in Fig. 2, having a valve and glass oil-cap hermetically closed, so as to be able to lubricate the pump even if the pipe 3 or branch pipe 9 should be stopped. The oil used as lubricant accumulates in the high-pressure trap 7 and is sent from there by its own pressure through the pipe-connection 5 and 6 back into the low-pressure trap 4, when the valves *e* and *f* are opened.

The lubricant under the high pressure existing in trap 7 contains from thirty to thirty-three per cent. of gas, which it loses when released from that pressure in the trap 4. It also parts with its heat at the same time. I claim that when this high-pressure oil is used in the pump-cylinder the liquid ammonia contained in the oil will evaporate the moment the oil reaches the cylinder, thereby partly filling the pump on the suction side with gas. In consequence the vacuum in the pump gets proportionally destroyed, thereby reducing the efficiency of the pump. It results, also, in decreasing the refrigerating capacity of the pump. For this reason I convey the oil into the low-pressure system to be cooled, where the oil loses the ammonia it absorbed under high pressure before it is reused for lubricating purposes.

By taking the lubricant to cool my stuffing-box from low-pressure trap 4, as shown and described, the outside packing of the stuffing-box S needs only to be tightened against low-pressure gas or oil, as the box is provided with a gas-collecting chamber, in which the gas escaping around the piston-rod assembles and is conveyed *via* the pipe 3 directly back into the low-pressure trap, as also shown and described, but not claimed in my application, Serial No. 222,893, of even date herewith. Thus I place the stuffing-box of the double-acting pump which I employ on the same footing with that of the single-acting pump.

Having thus described my invention, what I claim as new therein, and desire to secure by Letters Patent, is—

1. The combination of the high and low pressure traps, the pipes 5 6, connecting said traps together, a valve in each of said pipes, and the feed and discharge pipe $x$, communicating with said pipes 5 6 between said valves, substantially as set forth.

2. The combination, with the low-pressure trap 4, of the stuffing-box of the pump having a gas-collecting chamber, and a pipe connecting said chamber directly with the low-pressure trap, whereby the escape gas from the stuffing-box will be caught and conveyed directly back to the low-pressure system, substantially as set forth.

3. The combination, with the low and high pressure systems and the double-acting pump, of the stuffing-box S, having a gas and oil collecting chamber, said chamber having open communication with the low-pressure system, and the branch pipe 9, connecting the high and low pressure systems together and extending into the pump and having the valves $p\ p'\ p''$, substantially as set forth.

4. In a gas-compressing apparatus, the stuffing-box of the pump having a gas-collecting chamber for catching gas escaping around the piston-rod and said chamber having direct communication with the low-pressure gas-supply, substantially as set forth.

5. The combination of the high and low pressure traps connected together at their bottoms by pipes 5 6, valves $e\ f$ in said pipes, the filling and discharge pipe $x$, provided with a valve and having an open end adapted to be inserted in a vessel, the pump having a stuffing-box provided with a gas-collecting chamber, the pipe 3, connecting said chamber with the low-pressure trap, the branch pipe 9, connecting the pipe 3 with the pump and having communication with the high-pressure trap, and the valves $p\ p'$ in said pipe 9, substantially as set forth.

CHARLES G. MAYER.

Witnesses:
HERBERT KNIGHT,
FRANK A. BAKER.